(12) United States Patent
Mochizuki

(10) Patent No.: US 6,931,049 B2
(45) Date of Patent: Aug. 16, 2005

(54) LASER PLASMA GENERATION METHOD AND SYSTEM

(76) Inventor: Takayasu Mochizuki, 6-40-3, Honmachi, Shibuya-ku, Tokyo (JP)

( * ) Notice: Subject to any disclaimer, the term of this patent is extended or adjusted under 35 U.S.C. 154(b) by 0 days.

(21) Appl. No.: 10/102,868

(22) Filed: Mar. 22, 2002

(65) Prior Publication Data

US 2002/0141537 A1 Oct. 3, 2002

(30) Foreign Application Priority Data

Mar. 23, 2001 (JP) ........................................ 2001-085762

(51) Int. Cl.⁷ .............................................. H01S 3/091
(52) U.S. Cl. ............................... 372/76; 372/56; 372/78
(58) Field of Search ................................ 372/5, 55, 76, 372/56, 78; 315/111.21

(56) References Cited

U.S. PATENT DOCUMENTS

| | | | | |
|---|---|---|---|---|
| 6,014,401 A | * | 1/2000 | Godard et al. ................. | 372/97 |
| 6,229,111 B1 | * | 5/2001 | McCay et al. ......... | 219/121.59 |
| 6,388,227 B1 | * | 5/2002 | Dykhno et al. .......... | 219/121.6 |
| 6,417,485 B1 | * | 7/2002 | Troitski .................. | 219/121.69 |

FOREIGN PATENT DOCUMENTS

JP 11-250842 9/1999

OTHER PUBLICATIONS

Hoffman et al., "High Brightness Laser/Plasma Source for High Throughput Submicron X–ray Lithography", *Vacuum Science and Technology* B3(1), Jan./Feb. 1985, pp. 258–261.
Kandaka et al., "Effective Reduction of Debris Emitted from a Laser–Produced Plasma", *Japan J. Appl. Phys.*, vol. 37, Feb. 1998, pp. L174–L176.

* cited by examiner

*Primary Examiner*—Minsun Oh Harvey
*Assistant Examiner*—Cornelius H. Jackson
(74) *Attorney, Agent, or Firm*—Foley & Lardner LLP

(57) ABSTRACT

A main laser beam is focused to irradiate a tip of a high-density spouting gas flow formed by heating and then vaporizing a target material by a light beam for preheating making it to the plasma. As the result, the generation of a fast debris in the target material can be suppressed. And a discharge of the fast debris from the target material is also suppressed and extinguished by heating and then vaporizing them by a light beam for transpiration which is emitted at an adjusted time after the generation of the plasma. Thus, the fast debris which still appears in the plasma formed after preheating can be almost perfectly vaporized and extinguished by the light beam for transpiration.

18 Claims, 3 Drawing Sheets

LASER PLASMA GENERATION METHOD AND SYSTEM

BACKGROUND OF THE INVENTION

The present invention concerns laser plasma generation method using a target material and its system. The target material is at least one of liquid material, solid material and chemically inert gas element. The target material of the gas element is in a liquid or solid state at a low temperature, or in a low temperature gas state with a vapor density nearly equal to a density in the liquid state. And the method or system focuses and irradiates pulsed laser beam as the main laser beam onto the target to heat the target material, generating high-temperature high-density plasma.

Especially, it concerns practical laser plasma generation method and its system which can generate stable high-temperature high-density plasma continuously without giving any damages on x-ray optical components and x-ray detectors mounted around the plasma by the fast debris from the target.

Until now, in such laser plasma generation system the high-temperature high-density plasma is formed by focusing and irradiating a pulsed laser beam having a high-peak power into a spot of less than 100 $\mu$m in diameter on the target material of solid density. Application equipment of this x-ray has been used practically since 1970's, because this plasma lump radiates the x-ray of high-brightness.

Any of the target materials of solid density used here is solid material mainly composed of metals such as copper (Cu), aluminum (Al) and gold (Au). Therefore, there is a problem that molecules and atoms of the target material are evaporated by laser heating and deposit on the internal surface of the chamber wall, the surface of x-ray mirrors which collects the radiant x-ray, and the entrance window of x-ray detector, etc. Accordingly, these surfaces must be cleaned periodically.

In order to solve such problem, A. L. Hoffman et al (Vacuum Science and Technology B3(1), pp. 258, 1985) proposed the technology which prevents the dispersion of ejected solid debris by equipping a mechanical shutter in the space to the surface of the x-ray mirror.

N. Kandaka et al, Jap. J. Appl. Phy. 37, L147(1998), tried to stop the foregoing evaporated gas molecules to flow to the x-ray mirror by means of placing a gas cell that forms a dense buffer (collision) gas region. However it is not possible to take a sufficient degree of solid angle which collects the x-ray because the distance to the x-ray mirror is generally large.

On the other hand, Japanese Unexamined Patent Application (JP-A) No. H11-250842 has been disclosed for the purpose of obtaining laser plasma light source with high x-ray conversion efficiency and less scatters of debris. In this proposal, the dent formed on the surface of solid target is irradiated with the laser beam for ablation. By this irradiation, the surface part minute of internal wall of the dent is gasified and then the emitted gas is focused in the space inside the dent, for example in the vicinity of the central part of the exit to form the high-density lump. The high-temperature plasma is obtained by irradiating the pulsed laser to heat the high-density lump.

In this method, it is assumed that the generation of the debris is little because only the surface part minute is gasified and it is also assumed that the high-density lump formed at the exit of the dent restrains the emission of the fine debris to the outside.

As described above, when the plasma is generated by using the target material of liquid or solid, the strong shock wave arises and propagates into the inside of target material, because the local rapid pulse-like pressure rises with the generation of the plasma. In the meantime, the fine debris which have been produced by crushing the target material by the shock wave are discharged to the outside direction after the plasma lump consisting of electrons and ions diffused into the vacuum space.

There is a problem that the fine debris collides with the nearby surface, giving the mechanical damage when their speed, namely kinetic energy density, is large.

In conventional laser plasma generation systems which solve such problem, the method using the mechanical shutter does not only have a problem that ultrahigh speed rotation of the shutter is required, but also a problem that the acceptance solid angle for the x-ray is much limited. And, in the example of the gas cell method the block effect by the gas is too weak to stop the diffusion of fast debris which has a large momentum.

And, the practicability is questionable for the example of forming the high-density lump in the space in the dent and then irradiating it with the pulsed laser beam.

That is, in the focusing and irradiating of the pulsed laser beam, it is an important prerequisite that the target material which spouted from the surface part minute of the solid target converges according to the three dimensional effect by the dent, and forms temporarily a density-compressed gas lump.

However, in order to generate the plasma at a high-repetition rate it is necessary to form the dent beforehand at the right position precisely so that the laser beam is projected accurately on the target surface.

In addition, it is necessary to forms the uniform vapor flow to the focus spot from the wide parts in the surface of the dent so that the flows reach the focus spot simultaneously. The dent whose cross-sectional view has a hemispherical shape is exemplified in order to realize the process above described.

That is to say, it is necessary to irradiate the laser beam in such a way to almost uniformly heat full face of the hemi-sphere inside. And, the spherical structure is necessary in such a way that the vapor flows from the surface of the dent concentrate at the center of the exit, but its realization seems to be difficult. And, it has been described in the proposal that a very short pulsed high-peak power laser beam should be used for ablation because only the surface part minute of the dent needs to be gasified.

However, it is necessary that the target material surface must absorb the laser energy necessary for giving the kinetic energy to the material gasified in addition to vaporizing energy, in pico-second period. Thus it is not inevitable that a large pressure impulse with a high-peak power arises and this impulse likely drives a strong shock wave.

The shock wave crushes the solid material to generate the debris. Therefore, the inhibition of the debris generation can not be expected, even if the dent is used for gas compression. In addition, the high-density lump exists only for a short period compared to the duration of the debris generation and it is not possible to stop the debris scatter to the outside of the dent when the density of the lump is insufficient and unstable.

SUMMARY OF THE INVENTION

It is therefore an object of the present invention to provide a practical laser plasma generation method and its system which are capable of generating stable high-temperature high-density plasma continuously without suffering from mechanical damages onto optical elements, x-ray detector, etc. The damages may be caused by the fast debris from the target material.

High-temperature, high-density plasma is produced by focussing and irradiating the main laser beam on the target material which is solid and/or liquid.

The laser plasma generation method by this invention has the preheating procedure for the target material and the transpiration procedure for the debris in addition to the plasma production procedure in which the main laser beam is focused and irradiated onto the focus spot in the surface of the target material, gasifying it to make the plasma.

In the target material preheating procedure, the light beam for the preheating is prepared and it heats beforehand the focus spot of the main laser beam in the surface of the target material, melting and then gasifying it, and blowing a high-density spouting gas stream of electrically neutral material out to the direction perpendicular to the surface.

In the debris transpiration procedure, the light beam for the transpiration is prepared and it irradiates the vicinity of the focus spot after the plasma diffused and transpires the fine debris produced under the main laser beam irradiation.

After the gas flow was formed by the target material preheating procedure, the main laser beam irradiates the focus spot with the delay time from 5 ns to 100 $\mu$s, for example the delay time of 2 $\mu$s, by the plasma production procedure. Therefore, the main laser beam will rapidly heat the tip of the spouting gas flow.

The tip of spouting gas flow has a lower density than the liquid or solid density by a factor of several to ten, and therefore will be fully ionized by the irradiation of the main laser beam.

The degree of shock to the target material is attenuated because the shock wave driven by the plasma will propagate from the tip of the spouting gas flow to the surface of the target material through the inside of the flow of relatively low-density.

Thus, the followings are desired for the plasma production procedure in the case that the target material preheating procedure is executed. The main laser beam should be irradiated on the focus spot at the irradiation time delayed by a preset time from the irradiation time of the light beam for the preheating with the optic axis almost identical to that of the light beam for the preheating, making the spouting gas flow blown out into the plasma.

On the other hand, even when the main laser beam is focussed and irradiated directly on the target material at the focus spot to produce the plasma, the fine debris of the target material produced by the irradiation of the main laser beam will be transpired by the light beam for transpiration which illuminates the vicinity of the focus spot according to the debris transpiration procedure described above.

The above preset time may be one of the times from 5 ns to 100 $\mu$s. At least one of the light beam for the preheating and the light beam for the transpiration is desired to be the auxiliary laser beam. The fore-mentioned target material is desired to be cryo-target material which is chemically inert and made at least in one of liquid and solid states by being cooled, but in gaseous state at room temperature. And, in addition each of the light beam for the preheating and the main laser beam is desired to have the optic axis which is almost identical to the others and nearly perpendicular to the surface of the target material.

The laser plasma generation system by this invention is composed of at least one of the light beam generator for the spouting gas flow formation and the light beam generator for the transpiration in addition to the main laser beam generator, the optical component system and the pulsed beam control equipment.

The main pulsed laser beam generator generates a pulsed laser beam of high-peak power as the main laser beam which produces the plasma.

The light beam generator for the preheating generates the light beam for the preheating which irradiates the focus spot of the main laser beam in the surface of the target material, heating it beforehand and vaporizing the target material, and spouts the gas flow out in the direction perpendicular to the surface.

The light beam generator for the transpiration generates the light beam for the transpiration which irradiates the vicinity of the focus spot after the plasma produced by the main laser beam diffused, and transpires the fine debris.

Depending upon the light beam generated, the optical component system corresponds to the optical component system which transports and focuses the light beam for the preheating into the focus spot and/or the optical component system which transports and focuses the light beam for the transpiration into the preset range around the focus spot.

Pulsed beam control equipment adjusts each of the time difference, pulse duration, and pulse intensity of the pulsed irradiation for the light beams against the main laser beam as a reference.

DESCRIPTION OF THE PREFERRED EMBODIMENT

Figure 1:
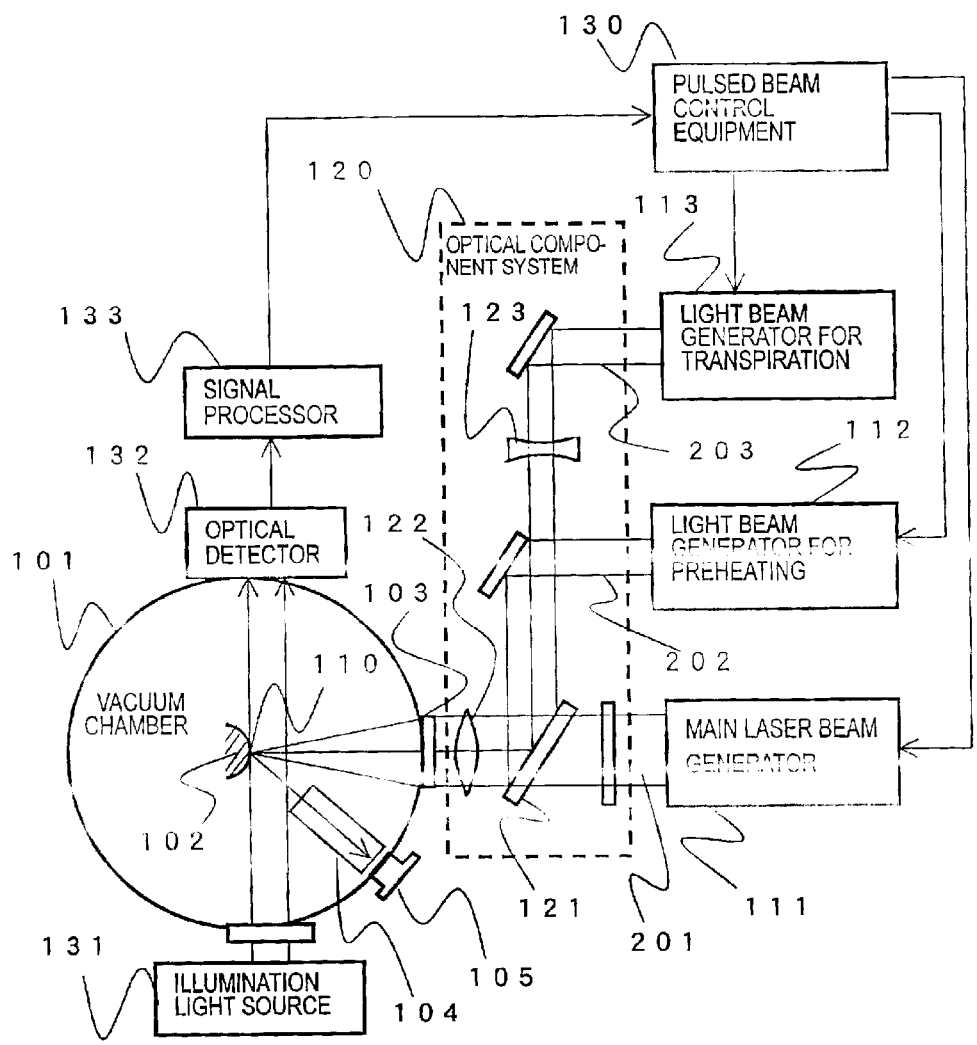
FIG. 1 shows a schematic diagram of a laser plasma generation system according to an embodiment of the present invention.

Now, a preferred embodiment of the present invention will be described with reference to the drawing.

FIG. 1 is a functional block diagram showing one embodiment of the present invention.

Laser plasma generation system as shown in FIG. 1 is composed of a vacuum chamber 101, a target material 102 of liquid and/or solid, a main laser beam generator 111, a light beam generator 112 for preheating, a light beam generator 113 for transpiration, optical component system 120, and a pulsed beam control equipment 130, as the major elements.

The vacuum chamber 101 contains the target material 102 of liquid and/or solid at the almost central part of the chamber, an entrance windows 103 to transmit each beam to a focus spot 110, and an x-ray mirror 104 condensing x-ray radiated from the plasma produced at the focus spot 110 and an x-ray detector 105.

The main laser beam generator 111 generates a high-peak power pulsed laser beam as a main laser beam 201 which produces the plasma.

The light beam generator 112 for preheating generates a light beam 202 for preheating. The light beam 202 for preheating is focussed and irradiated onto the focus spot 110 of the main laser beam 201 in the surface of the target material 102, heating it beforehand to vaporize and spout the gas flow of high-density out into the direction perpendicular to the surface.

The light beam generator 113 for transpiration generates a light beam 203 for transpiration. The light beam 203 for transpiration irradiates the vicinity of the focus spot 110 after the plasma produced by the main laser beam 201 diffused, and transpires the fine debris of the target material which were produced by the focussed irradiation of the main laser beam 201.

The optical component system 120 transports each of the beams above described to the irradiation spot.

The optical component system for the main laser beam generator 111 contains an optical mirror 121 and a focusing lens 122. The optical mirror 121 transports the main laser beam 201, and the focusing lens 122 focuses and irradiates the main laser beam on the focus spot 110 in the surface of the target material 102 through the entrance window 103.

With the optical component system for the light beam generator 112 for preheating, the light beam 202 for preheating is reflected by the same mirror 121 as transmits the above described main laser beam 201, via intermediate mirrors. And then the light beam 202 is focused and irradiated onto the focus spot 110 in the surface of the target material 102 after passing through the same optical path as the main laser beam 201. Focal diameter of the light beam 202 for preheating is adjusted to be almost equal to the focal diameter of the main laser beam 201 or a little larger than that.

With the optical component system for the light beam generator 113 for transpiration, the light beam 203 for transpiration is reflected by the same mirror 121 as transmits the above described main laser beam 201, via intermediate mirrors. And then the light beam 203 is focused and irradiated onto the focus spot 110 after passing through the same optical path as the main laser beam 201. The focal diameter of the light beam 203 for the transpiration is adjusted to be large enough compared with the focal diameter of the main laser beam 201 to enable the irradiation to all of the fast debris.

Therefore, there is installed a focusing lens 123 in the optical path for the light beam 203 for transpiration. This allows us to adjust the focus position of the light beam 203 separately from the focus position of the main laser beam 201 in such a way that the light beam 203 irradiates fully the vicinity of the place where the fine debris are discharged.

As the mirror 121, a polarization-selective mirror or a dichromatic mirror is used. The polarization-selective mirror has the property of totally reflecting P-polarized light and transmitting S-polarized light for the same wavelength. The dichromatic mirror has the property of totally reflecting or transmitting depending upon the light wavelength.

The pulsed beam control equipment 130 which controls the emergence time of each pulsed beam, controls the light beam generator 111 for preheating to deliver the light beam 202 for preheating before the main laser beam 201 is discharged from the main laser generator 111.

The pulsed beam control equipment 130 also controls the light beam generator 113 for transpiration to deliver the light beam 203 at the time delayed by the preset period against the synchronizing signal from the main laser beam generator 111.

In addition, the laser plasma generation system is equipped with an illumination light source 131, an optical detector 132 and a signal processor 133. The illumination light source 131 generates the illumination light which illuminates the fine debris ejected into the space near the focus spot 110 in the surface of the target material 102. The optical detector 132 detects scattered or transmitting illumination light and the detected signal is transferred to the pulsed beam control equipment 130 via the signal processor 133 after the signal processor 133 completed the processing of the signal.

Accordingly, in the pulsed beam control equipment 130, it is possible to recognize the emission of the fine debris in the space around the focus spot 110 from the signal processed.

The pulsed main laser beam 201 which is injected into the focus spot 110 of the target material 102 is operated at a high repetition rate with a high-peak power.

For example, the main laser beam generator generates the pulsed main laser beam with a wavelength of 1 $\mu$m, pulse energy of 0.7–1.0J, pulse duration of 10 ns and repetition frequency of 10 Hz—10 kHz in some laser plasma generation system. This main laser beam is focused and irradiated onto the focus spot with a diameter of about 100 $\mu$m in the surface of the target material. In this case the laser intensity on the target is about $10^{12}$W/cm$^2$.

This laser intensity forms the high-temperature high-density plasma in the size of the focus spot diameter and this plasma radiates the x-ray. The high-temperature high-density plasma produced in this way expands rapidly and disappears within 100 ns or less. In order to obtain steadily stable pulsed plasma by the operation of the main laser beam at a repetition rate of 10 Hz~10 kHz, fresh target material is supplied every laser pulse continuously to the focus spot by the use of rotating cylinder, conveying belt, or nozzle for liquid stream.

Figure 2:
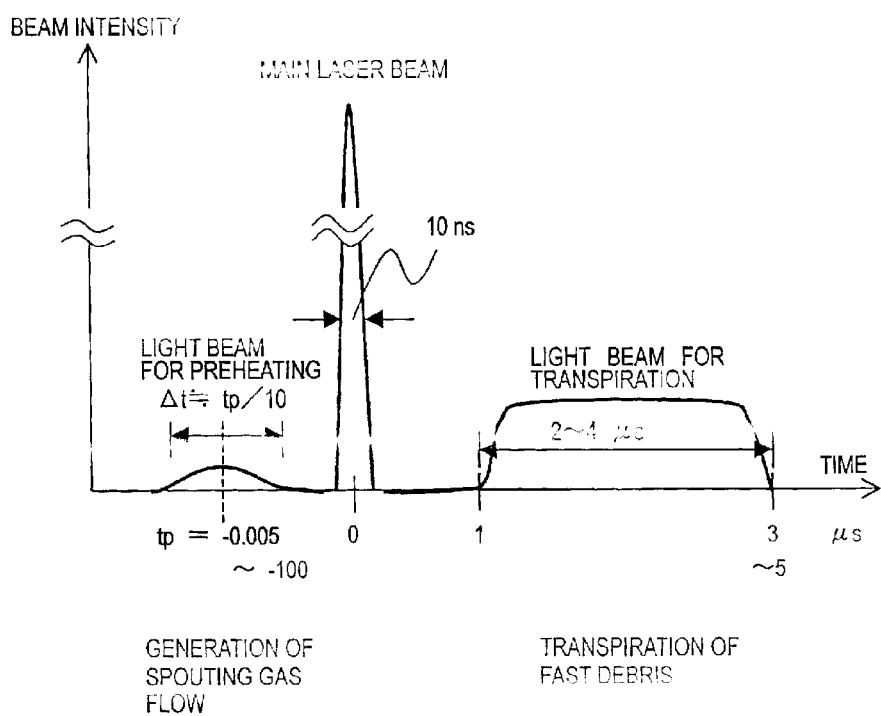
FIG. 2 shows a time chart which schematically describes the temporal behavior at the vicinity of the focus spot referring to the pulsed main laser beam.

Next, by referring to FIG. 1, FIG. 2 explains the situation of the light beams around the focus spot 110 which is irradiated by the pulsed main laser beam 201. The figure shows only a model for simplifying the explanation, so the comparison between the sizes or the pulse duration of the beams should be reference only.

To begin with, the light beam 202 for preheating heats the focus spot 110 by focussed irradiation at a certain time tp between 5 ns and 100 $\mu$s preceding the irradiation of the main laser beam 201 with a pulse duration $\Delta$t that is about one tenth of tp. In this case, the target material 102 at the focus spot 110 can be heated up to the evaporation temperature with much faster rate compared to the thermal conduction heating.

And, the pulse of light beam 202 for preheating has a gradual rise-time so that the strong shock wave is not generated in the surface of target material 102. As the result, the material component is evaporated as neutral atoms and molecules. Therefore, the target material 102 expands into the direction perpendicular to the surface of the target material 102 as the spouting gas flow whose density is high-dense, but lower than the solid density.

In this situation, the main laser beam 201 can produce a high-temperature high-density plasma by heating and ionizing the tip part of the above described spouting gas flow with a pulse duration, for example, of 10 ns.

The shock wave driven by the plasma formation will not directly destroy or heat the inside of the target because it is well reflected at the solid-density surface of the target material 102 after it propagated through the inside of the spouting gas flow which works as a buffer gas. That is to say, the generation of the debris in the target material 102 is drastically suppressed.

When the fast debris of the target material 102 appear in spite of the suppression above described, they are discharged at the time delayed by 0.1 μs to 1 μs against the irradiation time of the main laser beam 201. The speed and diameter of these fast debris are less than 1 km/sec and less than 10 μm, respectively. The time of fight needed for the fast debris to reach the place separated by 2 mm from the surface of the target material 102 is about 2 μs or more.

Therefore, the light beam 203 is introduced during the time period between 2 μs and 4 μs on the surface of the target material 102 with the delay time of 1 μs against the main laser beam 201. As the result, it is possible to irradiate synchronously the above described fast debris with the light beam 203 for transpiration.

By referring to FIGS. 1 and 2, FIGS. 3 and 4 explain the geometrical relationship among the spouting gas flow, the light beam for preheating and the main laser beam, and also the relationship between the debris appearance and the light beam for transpiration.

Figure 3:
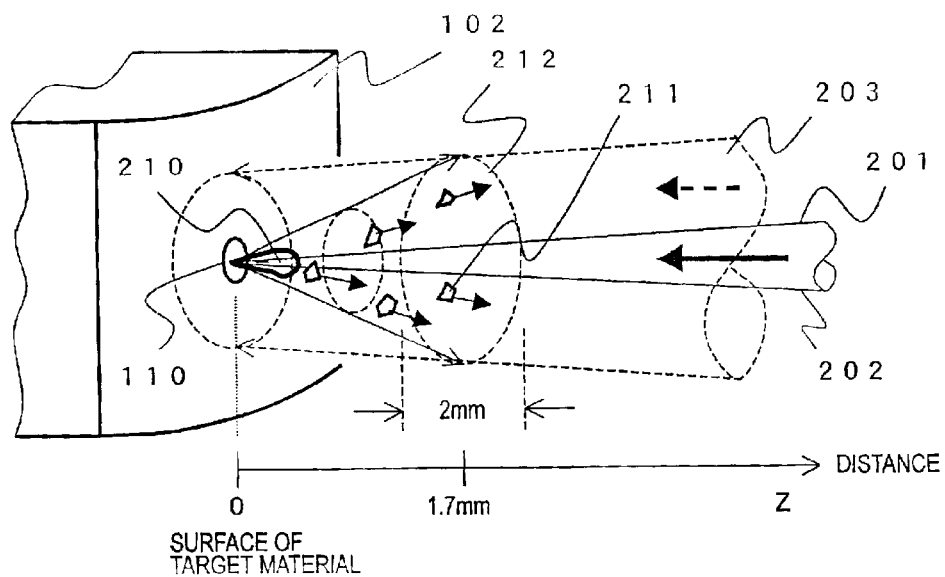
FIG. 3 shows a perspective view at the vicinity of focus spot.
Figure 4:
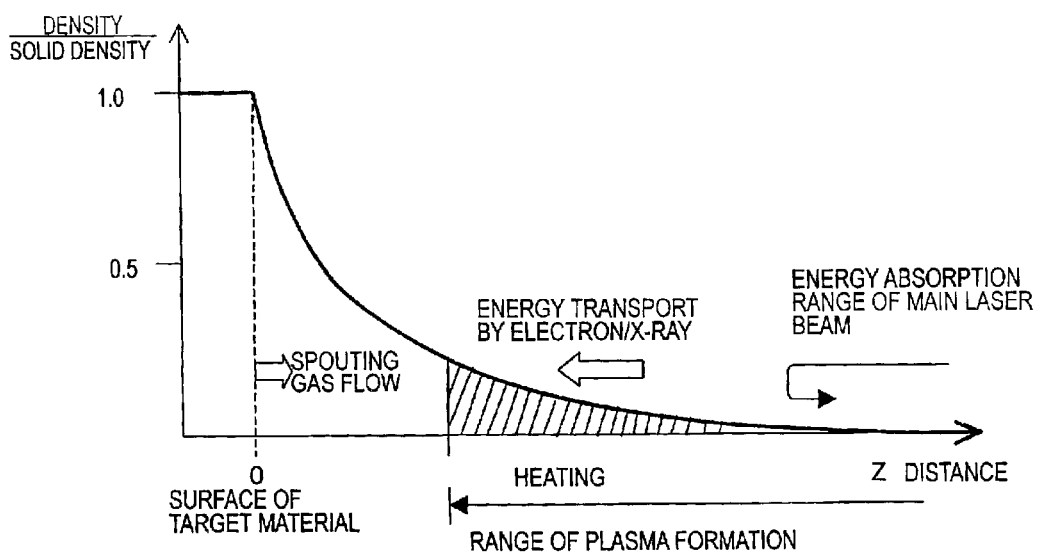
FIG. 4 shows a chart of the spatial density distribution of the gas in the spouting gas flow arising from the focus spot in the surface of the target where the density is normalized by the solid density.

FIG. 3 shows a perspective view in the vicinity of the focus spot in FIG. 1. FIG. 4 shows a chart of the density profiles in the spouting gas flows discharged from the focus spot, where the density is normalized by the solid density. Although the light beam 202 for preheating is shown by a half size of the main laser beam 201 in FIG. 1, the focused both beams are become in almost same shapes at the vicinity of the focus spot 110 as shown in FIG. 3. The light beam 203 for transpiration irradiates the vicinity of the focus spot 110 with the focus diameter which covers whole diffusion range of the fast debris 211 discharged from the focus spot 110.

The light beam 202 for preheating spouts a spouting gas flow 210 in the direction perpendicular to the surface of the focus spot 110 by being focused and irradiated in the focus spot 110 with the precedence to the irradiation of the main laser beam 201. In this condition, the main laser beams 201 irradiates the tip of the spouting gas flow 210 and makes it into the plasma.

The fast debris 211 is discharged from the focus spot 110 and concentrates almost in the inside of a conical region 212 within 30 degrees. Therefore, as shown in the figure the light beam 203 for transpiration irradiates a cylindrical irradiation region with the above-mentioned delay time. The cylindrical irradiation region has a diameter of about 2 mm in the plane which is separated by 1.7 mm from the target surface with the axis which is almost coaxial with the normal of the focus spot for irradiation.

For example, when the light beam has a set of its parameters, a pulse energy of 100 mJ, a pulse duration of 2 μs, and a wavelength of 1 μm to 10 μm, the intensity of the light beam which is focused into the irradiation region is $1.3 \times 10^6 W/cm^2$. Since the mass ablation rate of the target material is about $5 \times 10^3 g/cm^2 s$, the depth of direct ablation is about 30 μm within 2 μs, where solid xenon has the mass density of about $3 g/cm^2$. Thus the fast debris with a diameter of 10 μm or less are transpired and gasified sufficiently.

The timing at which the light beam 203 for transpiration is emitted is controlled by the pulsed beam control equipment 130, as shown in FIG. 2.

The illumination light source 131 illuminates the region irradiated by the light beam 203 for transpiration. By using the optical detector 132 which monitors and detects the intensity of the transmitting or reflecting illumination light, or the images of the fine debris which are discharged into the region illuminated, it is possible to measure and recognize the arrival time of fine debris.

In the explanation above described the light beams were assumed for the preheating and transpiration, but when they are auxiliary laser beams different from the main laser beam, the effect of heating or transpiration is enhanced. And, in the above explanation both of light beam generators for preheating and transpiration were assumed, but with even one of them the generation of the fine debris from the target material can be sufficiently suppressed compared to the conventional method.

The target material is desirable to be a cryo-target material that is chemically inert and made at least in one of the liquid and solid states by being cooled while in gaseous state at room temperature because the plasma can be generated without making the sedimentation adhesion of the target material and mechanical damages on x-ray optical elements and/or x-ray detectors.

Furthermore, it is preferable for both of the light beam for preheating and the main laser beam to have the almost identical optic axis with the direction almost perpendicular to the surface of the target material because the main laser beam can directly hit the spouting gas flow generated in the surface of the target. However, if the optic axis is angled with the normal of the target surface by the angle of less than 70 degree, the function equivalent to that above described can be realized by using an appropriate optical component system.

In the above description, the explanation has been made together with the appropriate data by referring to each of the drawings. However, the composition made by the shape, size, relative position and quantitative value which have been cited in the illustrations can be modified as long as the functions above described are preserved, thus this invention should not be limited in the embodiments explained above.

Furthermore, in the above explanation the case of x-ray emission from the plasma has been explained, but the scheme is applicable to any applications of the plasma produced in the procedures of this invention, and thus the above description does not limit this invention.

As described above, according to this invention the target material is gasified by the preheating to form the high-density spouting gas flow and is then made into the plasma. As the result, it is possible to suppress the generation of the fast fine debris from the target material. And, the light beam for transpiration adjusted in time can heat, transpire, and vaporize the fast debris discharged from the target material after the plasma diffused. As the result, it is possible to extinguish the fast debris and to suppress the emission of them in the same way as described above for the light beam for preheating.

Furthermore, with the combination of these beams the light beam for transpiration will almost perfectly vaporize the fast debris. The fast debris may still arise in the plasma even if being preheated. As the result, the multi-layer of the expensive x-ray mirror reflecting the x-ray radiated from the plasma and the x-ray detector are not damaged, and in addition only very small space is required for the transpiration. Therefore the x-ray mirror and the x-ray detector can be placed near the target material, thus the formation of the bright x-ray optical system which efficiently condenses the radiated x-ray will be realized.

The effect makes the exchange of x-ray mirror or x-ray detector unnecessary and enables us to obtain the quasi-continuous, point-like practical plasma.

While the present invention has been described in detail in conjunction with the preferred embodiment thereof, the present invention is not limited to the foregoing description but can be modified in various manners without departing from the scope of the invention set forth in appended claims.

What is claimed is:

1. A method of generating a high-temperature high-density plasma by heating a target material by focussing and irradiating a pulsed laser beam to the target material as a main laser beam, said method comprising a plasma production procedure and a target material preheating procedure and a debris transpiration procedure, wherein:
    said plasma production procedure comprises of the step of making the target material gasified in a focus spot near the surface of the target material into the plasma by using the main laser;
    said target material preheating procedure comprises of the steps of heating the surface of the target material prior to said plasma production procedure by irradiating a light beam for preheating, vaporizing the target material and spouting it as a high-density spouting gas flow in a direction perpendicular to the surface of the target; and
    said debris transpiration procedure comprises of the step of transpiring, using a light beam for the transpiration, the debris of the target material which are ejected from the vicinity of the focus spot after the plasma has diffused.

2. A method of generating a high-temperature high-density plasma according to claim 1, wherein said plasma production procedure comprises the steps of irradiating the focus spot by the main laser beam along an optic axis almost identical to the optic axis of the light beam for the preheating, said main laser beam irradiating taking place at a certain time delayed from the irradiation time of the said light beam for preheating.

3. A method of generating a high-temperature high-density plasma according to claim 1, wherein plasma production procedure comprises the steps of irradiating the focus spot by the main laser beam along an optic axis almost identical to the optic axis of the light beam for preheating, said main laser beam irradiating taking place at a time ranging from 5 ns to 100 $\mu$s delayed from the irradiation time of the said light beam for preheating, and making the spouting gas flow blown out by irradiation of the light beam for preheating into the plasma.

4. A method of generating a high-temperature high-density plasma according to claim 1, wherein at least one of the light beam for preheating and the light beam for transpiration is an auxiliary laser beam.

5. A method of generating a high-temperature high-density plasma according to claim 1, wherein said target material is cryo-target material which is chemically inert and in a gaseous state at room temperature, but becomes at least in one of liquid and solid states by cooling.

6. A method of generating a high-temperature high-density plasma according to claim 1, wherein each of the light beam for preheating and the main laser beam irradiates the said target material with an incidence angle within 70 degree to a normal to the target material surface and with the optic axis almost identical to the other.

7. A system of generating a high-temperature high-density plasma by heating a target material which is at least in one of liquid and solid states by focusing and irradiating a pulsed laser beam on the target material as a main laser beam, comprising:
    a main generator for generating a main pulse laser having a high-peak power pulse laser beam as a main laser beam which produces said plasma;
    a preheating generator for generating a light beam which heats beforehand a surface of the target material, vaporizing the target material and spouting it as a high-density spouting gas flow in a direction normal to the target material surface;
    a transpiration generator for generating a light beam for transpiration which irradiates the vicinity of the target material surface and transpires debris of the said target material produced by the said main laser beam after the said plasma has diffused;
    at least one system of optical components corresponding to the light beams generated, one transporting and focusing the light beam for preheating onto the target material surface, and another transporting the light beam for transpiration onto a region adjacent the target material surface; and
    pulsed beam control equipment for adjusting a timing of the main laser pulse, the light beam for preheating and the light beam for transpiration relative to each other.

8. A system of generating a high-temperature high-density plasma according to claim 7, wherein said target material is composed of cryo-target material which is chemically inert and in a gaseous state at room temperature, but becomes at least in one of liquid and solid states by cooling.

9. A system of generating a high-temperature high-density plasma according to claim 7, wherein at least one of said light beam for preheating and said light beam for transpiration is the auxiliary laser beam.

10. A system of generating a high-temperature high-density plasma according to claim 7, wherein said system of optical components transports and focuses both of the light beam for preheating and the main laser beam onto a focus spot on the target material surface with the incidence angle within 70 degrees to a normal of the target material surface and with an almost identical optic axis, and adjusts a focus spot of the light beam for transpiration in such a way that it has a diameter larger than the focus spot size of the main laser beam.

11. A system of generating a high-temperature high-density plasma according to claim 7, wherein said pulsed beam control equipment makes the light beam for preheating irradiate the said target material at a predetermined time prior to an irradiation time of the main laser beam.

12. A system of generating a high-temperature high-density plasma according to claim 7, wherein said pulsed beam control equipment makes the light beam for preheating irradiate the said target material at a time ranging from 5 ns to 100 $\mu$s prior to an irradiation time of the main laser beam.

13. A system of generating a high-temperature high-density plasma by heating a target material having a target surface comprising:
    a first generator for generating a first light beam which preheats the target surface to produce a high-density spouting gas vaporized from the target material;
    a main generator, operative after the first generator, for generating a main laser beam which heats the high-density spouting gas to produce a plasma;
    a second generator, operative after the main generator, for generating a second light beam which irradiates a space around the plasma to transpire debris ejected from the target surface in the vicinity of the plasma; and
    beam control equipment connected to the first, the main, and the second generators for adjusting a timing of generating the main laser beam, the first light beam, and the second light beam.

14. The system according 13, further comprising:

a first optical system coupled to the first generator for directing the first light beam to a predetermined area of the target surface, high-density spouting gas spouting from the target material in a particular direction substantially normal to the target surface;

a main optical system coupled to the main generator for directing the main laser beam to the high-density spouting gas, the main laser beam being incident to the high-density spouting gas in the particular direction; and a second optical system coupled to the second generator for directing the second light beam to the plasma to irradiate a space around the plasma.

15. The system according to claim 13, wherein the target material is composed of cryo-target material which is chemically inert and in gaseous state at room temperature, but becomes at least in one of liquid and solid states by cooling.

16. A method of generating a high-temperature high-density plasma by heating a target material by focusing and irradiating a pulsed laser beam to the target material as a main laser beam, comprising the steps of:

generating a first light beam which preheats a target surface of the target material to produce a high-density spouting gas vaporized from the target material;

generating a main laser beam which heats the high-density spouting gas to produce a plasma, the main laser beam being a high-peak power pulse laser beam;

generating a second light beam which irradiates a space around the plasma to transpire debris ejected from the target surface in the vicinity of the plasma; and adjusting a timing of generating the first light beam, the main laser beam and the second light beam.

17. The method according to claim 16, further comprising:

directing the first light beam to a predetermined area of the target surface, high-density spouting gas spouting from the target material in a particular direction substantially normal to the target surface;

directing the main laser beam to the high-density spouting gas, the main laser beam being incident to the high-density spouting gas in the particular direction; and directing the second light beam to the plasma to irradiate a space around the plasma.

18. The method according to claim 17, further comprising:

focusing the first light beam on the target surface;

focusing the main laser beam to the high-density spouting gas at a certain time delayed from irradiation time of the first light beam; and irradiating the second light beam into the space around the plasma.

* * * * *